(12) United States Patent
LeComte et al.

(10) Patent No.: US 7,864,759 B2
(45) Date of Patent: Jan. 4, 2011

(54) SYNCHRONIZATION OF SECURED AUDIOVISUAL STREAMS

(75) Inventors: Daniel LeComte, Paris (FR); Sébastien Georges, Paris (FR)

(73) Assignee: Nagra France (FR)

( * ) Notice: Subject to any disclaimer, the term of this patent is extended or adjusted under 35 U.S.C. 154(b) by 1521 days.

(21) Appl. No.: 10/537,323

(22) PCT Filed: Dec. 9, 2003

(86) PCT No.: PCT/FR03/50158

§ 371 (c)(1),
(2), (4) Date: Aug. 20, 2005

(87) PCT Pub. No.: WO2004/056114

PCT Pub. Date: Jul. 1, 2004

(65) Prior Publication Data

US 2006/0088162 A1    Apr. 27, 2006

(30) Foreign Application Priority Data

Dec. 9, 2002    (FR) .................................. 02 15540

(51) Int. Cl.
*H04L 12/56*    (2006.01)
*H04N 7/167*    (2006.01)

(52) U.S. Cl. ..................... 370/389; 360/60; 380/201; 386/94

(58) Field of Classification Search ................ None
See application file for complete search history.

(56) References Cited

U.S. PATENT DOCUMENTS 5,892,825 A    4/1999    Mages et al.

5,903,264 A *  5/1999    Moeller et al. ............... 715/719

(Continued)

FOREIGN PATENT DOCUMENTS

EP    0 778 513 A2    6/1997

(Continued)

OTHER PUBLICATIONS

J.P. Jarmasz et al., "Designing a distributed multimedia synchronization scheduler", IEEE Comput. Soc., US, Jun. 3, 1997, pp. 451-457.*

(Continued)

*Primary Examiner*—Hong Cho
*Assistant Examiner*—Robert C Scheibel
(74) *Attorney, Agent, or Firm*—DLA Piper LLP (US)

(57)    ABSTRACT

This invention relates to a device capable of transmitting in a secured manner a set of films of high visual quality to a display screen of the TV screen type and/or for being recorded on the hard disk or on any other recording support of a box/connector connecting the teletrans-mission/telecommunication network to the display screen such as a TV screen or a personal computer monitor while preserving the audiovisual quality, but avoiding fraudulent use such as the possibility of making pirated copies of films or audiovisual programs recorded on the hard disk or on any other recording support of the set-tope boxy/decoder boxy. The invention also concerns a client-server system and the synchronization mechanism between the server supplying the stream permitting the viewing of the secured digital video film and the client who reads and displays the digital video stream.

18 Claims, 2 Drawing Sheets

U.S. PATENT DOCUMENTS

| | | |
|---|---|---|
| 5,937,164 A | 8/1999 | Mages et al. |
| 6,035,329 A | 3/2000 | Mages et al. |
| 6,185,306 B1 | 2/2001 | Mages et al. |
| 6,377,690 B1 * | 4/2002 | Witschorik .................. 380/268 |
| 7,382,969 B2 * | 6/2008 | Dawson ....................... 386/94 |
| 2001/0036355 A1 | 11/2001 | Morris et al. |
| 2002/0010917 A1 * | 1/2002 | Srikantan et al. ................ 725/1 |
| 2002/0164024 A1 | 11/2002 | Hata et al. |
| 2003/0046369 A1 * | 3/2003 | Sim et al. ................... 709/220 |
| 2003/0222994 A1 * | 12/2003 | Dawson ...................... 348/247 |
| 2004/0168185 A1 * | 8/2004 | Dawson et al. ................ 725/38 |
| 2005/0163231 A1 * | 7/2005 | Kato ..................... 375/240.28 |
| 2006/0271973 A1 * | 11/2006 | Jerding et al. ................. 725/86 |
| 2009/0282444 A1 * | 11/2009 | Laksono et al. ............... 725/89 |

FOREIGN PATENT DOCUMENTS

| | | |
|---|---|---|
| EP | 0 949 815 A * | 10/1999 |
| FR | 2 812 147 A * | 1/2002 |
| WO | WO 99/08428 A1 | 2/1999 |
| WO | WO 00/44172 A * | 7/2000 |
| WO | WO 00/49483 A1 | 8/2000 |
| WO | WO 01/65762 A2 | 9/2001 |
| WO | WO 01/78386 A * | 10/2001 |
| WO | WO 01/97520 A2 | 12/2001 |
| WO | WO 02/15579 A * | 2/2002 |

OTHER PUBLICATIONS

C. Griwodz et al., "Protecting VOD the Easier Way", ACM International Multimedia Conference, US, vol. Conf. 6, Sep. 12, 1998, pp. 21-28.*

* cited by examiner

SYNCHRONIZATION OF SECURED AUDIOVISUAL STREAMS

RELATED APPLICATION

This is a §371 of International Application No. PCT/FR2003/050158, with an international filing date of Dec. 9, 2003 (WO 2004/056114 A1, published Jul. 1, 2004), which is based on French Patent Application No. 02/15540, filed Dec. 9, 2002.

FIELD OF THE INVENTION

This invention relates to processing digital video streams. The invention also relates to a system that permits recomposing digital video content that was previously visually scrambled.

This invention relates to a device capable of transmitting in a secured manner a set of films of high visual quality to a display screen of the TV screen type and/or for being recorded on the hard disk or on any other recording support of a box connecting the teletransmission network to the display screen such as a TV screen or a personal computer monitor while preserving the audiovisual quality, but avoiding fraudulent use such as the possibility of making pirated copies of films or audiovisual programs recorded on the hard disk or on any other recording support of the set-top box. The invention also concerns a client-server system and the synchronization mechanism between the server supplying the stream permitting the viewing of the secured digital video film and the client who reads and displays the digital video stream.

BACKGROUND

It is possible with current solutions to transmit audiovisual films and programs in digital form via broadcasting networks of the, cable, satellite, etc. type or via telecommunication networks of the DSL (Digital Subscriber Line) type or BLR (local radio loop) or via DAB (Digital Audio Broadcasting) networks, etc. Moreover, in order to avoid the pirating of works broadcast in this manner, these works are frequently encrypted or scrambled by various well known means.

However, the main disadvantage of current solutions such as in WO 01/65762 is that it is necessary to transmit not only the encrypted data to the users, but also the decryption keys. The transmission of the decryption keys can be made before, at the same time as or after the transmission of the audiovisual programs. In order to increase security and therefore the protection of audiovisual works against an ill-intended use, the decryption keys as well as the decryption functions of the audiovisual decoders can comprise improved security means such as smart cards or other physical keys that can optionally be remotely updated.

Thus, the current solutions applied to a set-top/decoder box with the possibility of the local recording of audiovisual programs in digital form on any support of the hard disk type or some other type of memory offers an ill-intentioned user the possibility of making non-authorized copies of the programs recorded in this manner, since at a given moment this user possesses with the digital settop/decoder box, whether associated or not associated with smart card systems, all the information, software programs and data permitting a complete decryption of the audiovisual programs. Precisely by virtue of the fact that the user possesses all the data, the ill-intentioned user will have the possibility of making illegal copies without anyone perceiving this fraudulent copy at the moment at which it is made.

One solution could therefore consist of transmitting all or part of a digital audiovisual program solely on demand (video services on demand) through a broadband telecommunication network of the ADSL, cable or satellite type without authorizing the local recording of the audiovisual programs. The disadvantage there is quite different and stems from the performances of these networks, that do not allow continuous streams of several megabits per second to be guaranteed to each user, as required by MPEG streams, that require bandwidths of several hundred kilobits to several megabits per second.

Under those conditions, one solution consists of separating the streams into two parts of which one can not be used by itself. WO 99/08428 teaches a process for the multi-application processing of an active, localizable terminal in which at least one connection is made to an identifiable program dedicated to carrying out an application, which program dictates its conditions of use to the terminal for making the functions available. The terminal communicates on an ad hoc basis by using a connection with the management center for the realization, if necessary, of the inputs and outputs of the capacities of the latter, which management center becomes a slave or does not become a slave of the terminal at the level of the application software relative to the entering program. That disclosure also concerns the process of identifying the program and the terminal in use. It divides the stream into one part identifying the user and into one part containing the program properly speaking. It is not unusable, but only locked by the first part. Finally, it does not present any solution for synchronizing the parts.

On the other hand, EP 0 778 513 describes a process permitting the prevention of the illegal use of information by adding control information to verify the rights of the user. The system permits the permanent knowledge of which part of the information is being used and by which user and consequently to know if the user is illegal or not. That process thus secures the data by adding additional information that denatures the initial information.

WO 00/49483 also offers processes and systems for creating a connection between the users and an editor of digital entities. The process comprises at least one of the following steps: subdividing the digital entity into two parts; memorizing one part in a memory zone of the server connected to a computer network; transmitting the other part to at least one user with computer equipment; connecting the computer equipment to the computer network; establishing a functional connection between the first part and the second part. These processes and systems do not specify on the one hand if the memorized part on the server can be stored by the user, which would permit pirating of the digital entity, and on the other hand do not specify the manner of synchronizing these two parts.

U.S. Pat. No. 5,937,164 uses a solution consisting of separating the stream into two parts of which the smallest one contains information necessary for using the largest one. However, it is not sufficient for responding to the problem identified. In fact, suppression of one part of the stream denatures the format of the stream and it can therefore not be recognized as a standard stream that can be used with general software applications. That process simultaneously necessitates a specific software on the server side for the separation of the two parts and another specific software that assures not only reconstruction of the stream, but also acquisition of the main stream and its use according to a format proprietary for the solution. The proprietary format is not the initial format of the stream before separation into two parts in that solution.

U.S. Pat No. 5,892,825 resumes the preceding patent, but in a narrower scope because the streams in it are always encrypted. U.S. Pat. No. 6,035,329 is based on the same principle and concerns a process permitting reading a disk of the CE-ROM or DVD-ROM type conditioned by the identification of the rights by inserting a smart card on which the information necessary for reading is stored. That process is still not sufficient because it does not guarantee that the modified stream has the same format as the original stream. U.S. Pat. No. 6,185,306 concerns a process for transmitting encrypted data from a web site to a requesting computer. However, that process allows the user to have all the tools necessary for copying the data at a given moment.

WO 00/44172, discloses a system of video distribution on demand consisting of transmitting encrypted video streams from a supplier to one or several receivers. The encrypted video is stored in advance in the receiver and displayed at a later date. The display request is addressed to a video sender that sends the decryption information for an immediate display of the video stream. The decryption information is sent to the receiver via a separate path or via the same path as the encrypted video. Before sending the keys (static or dynamic) for the decryption a step for the identification of the receiver is carried out. This prior art therefore describes a system of encryption with the aid of a key or keys that is well known. However, the entire video stream protected by encryption is stored in the receiver and the data set of the video stream is located inside the protected video and is therefore vulnerable to being pirated.

U.S. 2002/0164024 A1, concerns a system for processing video and audio data based on a relation of prediction between frames, containing a module for fragmentation of the data, a module for encryption of part of the data, a sending module, a module for differentiating the processing by type of frames I, P, B and their classification in separate files, a receiving module, a decryption module and a module for assembling data. The encryption process is carried out solely on fragments comprising images I, that are decrypted and reassembled in the receiver, thus reconstituting the video, which reconstitution is carried out by aligning packets in increasing order of the time reference indicated in the binary stream. It describes a system of "classic" encryption with optimization of encryption. The fragmentation is applied to separate the I images from the rest of the stream to encrypt them. After this selective encryption, the fragments are sent using different queues. However, all the data of the audiovisual stream remain inside the protected stream with all or part of the stream not being encrypted.

WO 01/97520 also teaches methods, processes and devices for controlling the transmission and recording of digital content of the MPEG-2 type. However, it does not teach any specificity for synchronization the streams constituting the two parts of one and the same audiovisual program. Moreover, that method is totally ineffective for low bandwidth telecommunication networks because it substitutes all or part of the I images, whose weight in bytes is very expensive during transmission of the second stream.

SUMMARY OF THE INVENTION

This invention relates to a process for distributing video sequences in accordance with a nominal stream format including a succession of images/pictures, which nominal stream, on which an analysis is made prior to transmission to client equipment for generating a modified main stream, has a format of the nominal stream and has images/pictures modified by substitution of selected data by similar data, but random or calculated, and has complementary information of any format including substituted data and digital information suitable for permitting reconstruction of a modified nominal stream, and then for separately transmitting the modified main stream in real time or deferred time and the complementary information in real time at substantially the moment of display from a server to the client equipment, and for which a synthesis of an available stream in a nominal format is calculated on the client equipment, reconstituted as a function of the modified main stream and of the complementary information and a reading of the stream on the client equipment, wherein during reading of the stream a stage includes generating a position identifier as a function of characteristics of the stream, which position identifier is transmitted from the server that activates in response sending the complementary information as a function of the position identifier.

This invention also relates to equipment for producing a video stream including at least one multimedia server containing original video sequences, a device for analyzing the video stream coming from the server for generating a modified main stream and complementary information, a device for synchronizing transmission of the complementary information as a function of a position identifier transmitted by recipient equipment.

This invention further relates to a system for transmitting a video stream including equipment for producing a video stream, at least one piece of equipment for using a video stream and at least one communication network between the production equipment and the piece or pieces of equipment.

BRIEF DESCRIPTION OF THE DRAWINGS

The invention will be better understood from a reading of the following description of a non-limiting exemplary embodiment that makes reference to the attached drawings.

DETAILED DESCRIPTION

This invention relates in a general meaning to a process for distributing video sequences in accordance with a nominal stream format constituted by a succession of images, which nominal stream, on which an analysis is made prior to transmission to client equipment for generating a modified main stream, has the format of the nominal stream and has images modified by substitution of certain data by data of the same nature, but random or calculated, and has complementary information of any format comprising substituted data and digital information suitable for permitting reconstruction of the modified nominal stream, and then for separately transmitting the modified main stream in real time or deferred time and the complementary information in real time at the moment of display from the server to the recipient equipment, and for which a synthesis of an available stream in a nominal format is calculated on the recipient equipment, reconstituted as a function of the modified main stream and of the complementary information and a reading of the available stream on the recipient equipment, characterized in that the process comprises during the reading of the stream a stage of generating a position identifier as a function of the characteristics of the read stream, which position identifier is transmitted to the server that activates in response sending the complementary information as a function of this position identifier.

According to one aspect, each image of the nominal stream is associated with a position indicator.

According to another aspect, the reading stage comprises an operation for calculating the position identifier of the image read.

According to yet another aspect, a reading stage comprises an operation for calculating the position identifier of the stream read.

The complementary information is advantageously sent in portions.

According to a one embodiment, the available stream on the recipient equipment of which the reading conditions the position and the portion to be sent of the complementary information is a part of the modified main stream.

According to another embodiment, the available stream on the recipient equipment of which the reading conditions the position and the portion to be sent of the complementary information is a part of the reconstituted main stream.

In yet another embodiment, the nominal stream format is defined by the MPEG-2 standard. In that particular embodiment, the position identifier for an image is constituted of the time code variable associated with the group of images in which the image under consideration is located and the temporal reference variable for the image, that are variables defined by MPEG-2.

Each portion of the complementary information sent by the server advantageously permits reconstitution of at least one image of the original stream during the synthesis.

According to embodiment, the server adapts the size and the content of each portion of the complementary information to be sent as a function of the position identifier.

In a preferred embodiment, each portion of the complementary information is sent in advance relative to the instant of display of the image/picture of the stream reconstituted with this portion.

In one embodiment, the sender adapts the sending of complementary information when the user of the recipient equipment makes a pause, stopping transmission of complementary information. Likewise, the server adapts the sending of complementary information when the user of the recipient equipment makes a rapid advance or a rapid return by sending the portion corresponding to the proper position for the commands "rapid advance" and "rapid return". In the same manner, the server adapts the transmission of complementary information when a network breakdown occurs that prevents the client-server communication by stopping transmission of complementary information during the breakdown and restarting it when the breakdown stops and it again receives the messages coming from the client.

Prior to transmitting the complementary information, the server advantageously creates a table associating the pointers to the portions of the complementary information with the temporal positions relative to the images of the video stream, stores this table on a support connected to the server and consults the table to determine the portion of complementary information to be transmitted after having received position identifier.

The invention also relates to equipment for producing a video stream for implementing the process as described above, comprising at least one multimedia server containing the original video sequences, a device for analyzing the video stream coming from the server for generating the modified main stream and the complementary information and which comprises in particular a device for synchronizing transmission of the complementary information as a function of the position identifier transmitted by the recipient equipment.

Finally, the invention relates to a system for transmitting a video stream in accordance with the above-described process, comprising equipment for producing a video stream, at least one piece of equipment for making use of a video stream and at least one communication network between the production equipment and the piece or pieces of equipment.

The general principle of a process for securing a video stream is disclosed below. The invention concerns a process for distributing digital video sequences according to a nominal stream format constituted of a succession of images/pictures (or the MPEG format), each of which comprises at least one digital block regrouping a certain number of coefficients corresponding to simple video elements coded digitally in accordance with a manner specified within the stream concerned, and used for all the video decoders capable of displaying it to be able to decode it correctly, and possibly organized in a hierarchical manner in a group of images/pictures and sequences.

The format advantageously contains means for localizing the digital picture in the stream with the aid of a temporal position identifier allowing the knowledge of at what moment the picture in question is to be displayed.

The process comprises:

A preparatory stage consisting of modifying at least one of the elements of one of the images/pictures. The binary stream generated in this manner is called the modified main stream;

A transmission stage:
  of the modified main stream in conformity with the format of the nominal stream, constituted of pictures containing the elements modified in the course of the preparatory stage, and
  Complementary digital information via a path separate from the modified main stream that permits reconstitution of the original stream from the calculation on the recipient equipment as a function of the modified main stream and the complementary information. The complementary information is defined as a set constituted of data (e.g., elements describing the original digital stream or extracts of the original stream) and functions (e.g., substitution or swapping function). A function is defined as containing at least one instruction relating data and operators. The complementary information describes the operations to be carried out to recover the original stream from the modified main stream.

Reconstitution of the original stream is carried out on the recipient equipment from the modified main stream already present in the recipient equipment or transmitted in real time and from the complementary information transmitted in real time at the moment of display comprising data and functions carried out with the aid of digital routines (set of instructions). The complementary information is transmitted by the server as a function of the position of the reading head in the stream available on the client equipment. The position, defined by a position identifier or synchronization element is transmitted regularly by the client to the severs in accordance with the instant of display by the client of the stream available on the client equipment. The available stream on the client equipment is identical to the original stream if the client has the right to display it and if the client has a connection to the server containing the information complementary to or identical to the modified main stream if this is not the case.

When the available stream on the recipient equipment is identical to the original stream the user can view it on a screen and if the user wishes to move in the video sequence the client informs the server of the new position of the reading head and the server then transmits the necessary complimentary information to the client to reconstitute the portion of the film that is to be viewed.

The term "scrambling" denotes modification of a digital video stream with suitable methods in such a manner that the stream remains in conformity with the standard with which it was digitally encoded while rendering it playable by a visual display, but altered from the viewpoint of human visual perception.

The term "descrambling" denotes the restitution process with appropriate methods of the initial stream, which video stream restored after scrambling is identical to the initial video stream.

This invention provides protection by means of scrambling the video stream integrally based on its structure, which protection includes modifying targeted parts of the bitstream (structured binary stream) essential for comprehension of the film by the human eye. The true values of these targeted parts are extracted from the bitstream and stored as complementary information and random or calculated values or swapped values are placed in their place, which is done for the entire video stream. Thus, "decoys" are added for the settop/decoder box, that is to say, values comprehensible to the settop/decoder box, but not identical to those presented in the nominal stream, which receives a video stream at the input completely conforming to the original video format but which is not acceptable from the viewpoint of visual perception by a human being.

Inversely to the majority of known encryption systems, the principle described below permits a high level of protection to be ensured without necessitating a high bandwidth client-server connection since the complementary information to be transmitted only represents a low percentage of the original video stream and the modified main stream is already present in the client equipment.

The protection, realized in a manner in conformity with the invention, is based on the principle of the suppression and/or replacement of information describing the video signal by any method, e.g., substitution, modification or shifting of the information. This protection is also based on a knowledge of the structure of the stream at the output of the video encoder: Scrambling is a function of the content of the digital video stream. Reconstitution of the original stream is performed on the recipient equipment from the modified main stream already present or received in real time in the recipient equipment and from the complementary information transmitted in real time at the moment of display comprising data and functions executed with the aid of digital routines (set of instructions).

This invention concerns in particular the synchronization process between the supplier of the complementary information (the server) and the reader/display device installed at the client. To this end, the invention uses synchronization elements (or position identifiers of the reading head in the stream available on the recipient equipment) that permit the connection to be made between a given portion of the complementary information and the part of the modified main stream that it allows to be modified to reconstitute the corresponding part of the nominal stream. For example, the invention makes use of temporal position data relative to the reading head of the client in the video stream available on the client equipment like that contained in a MPEG stream to determine the complementary information to be translated.

Another possibility, corresponding to another exemplary embodiment, is to number the pictures of the modified main stream and to-indicate in the different portions of the complementary information the number of the picture or pictures of the modified main stream that the portion allows to be modified to reconstitute the corresponding part of the nominal stream.

Another exemplary embodiment includes utilizing binary words calculated from the modified main stream in that a given binary word is specific to a given portion of the modified main stream, that is then specified in the corresponding portion of the complementary information.

Another exemplary embodiment includes utilizing binary words calculated from the modified main stream in that a given binary word is specific to a given picture of the modified main stream, that is then specified in the corresponding portion of the complementary information.

Another exemplary embodiment includes adding a single binary word to each user field of the modified main stream (field "user data" of MPEG-2, for example) and to the corresponding portion of the complementary information. A user field is characterized in that binary information can be added to it without affecting displaying the binary video stream containing it.

Whatever the solution selected, the client regularly transmits to the server the position identifier of the reading head of the client in the stream available on the recipient equipment (temporal position or binary word) permitting the server to determine the portion of the complementary information which the client equipment requires for transforming the modified main stream to reconstitute the corresponding part of the nominal stream.

Figure 1:
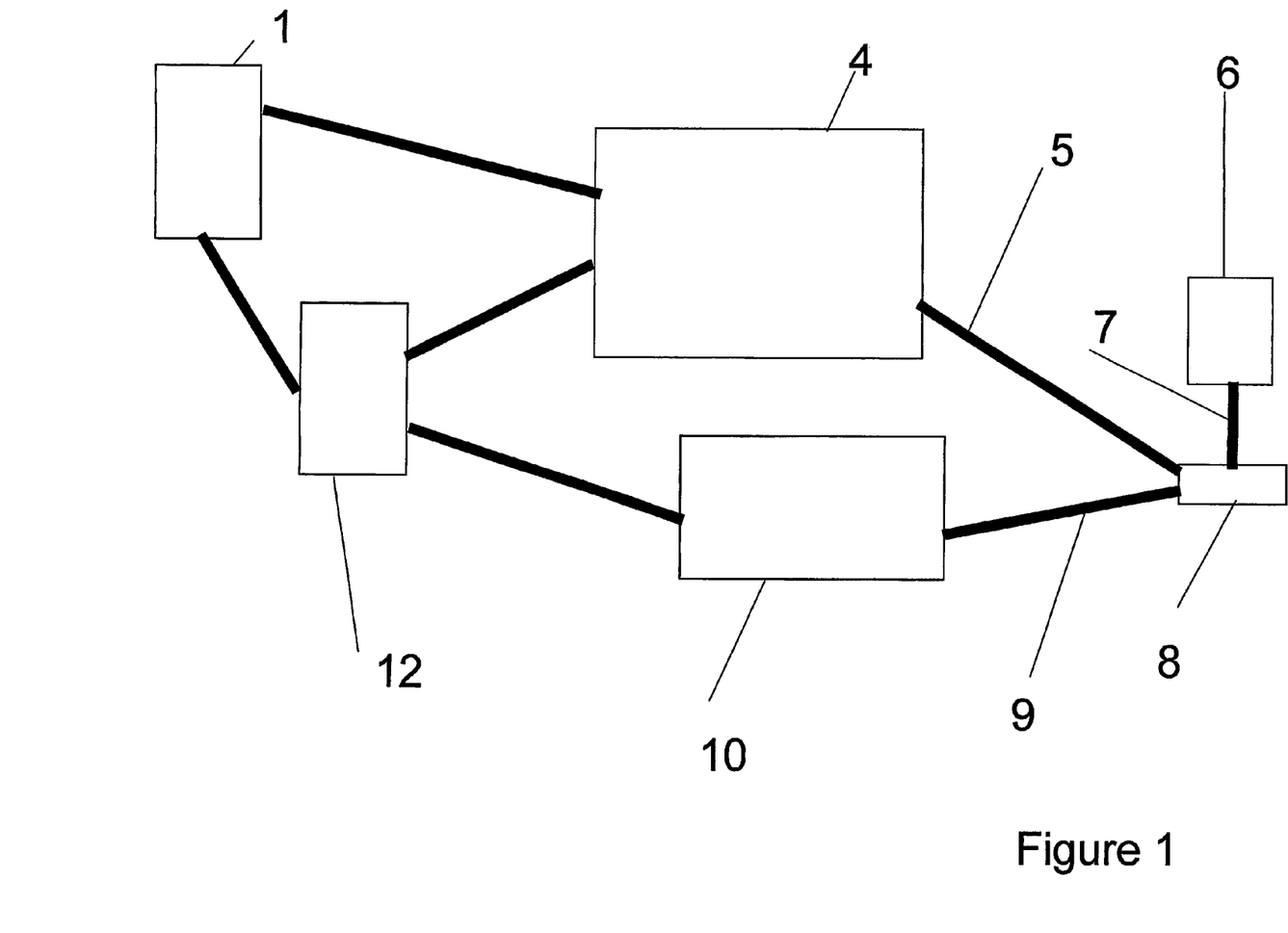
FIG. 1 describes the architecture of an entire system for implementing the process of the invention.
Figure 2:
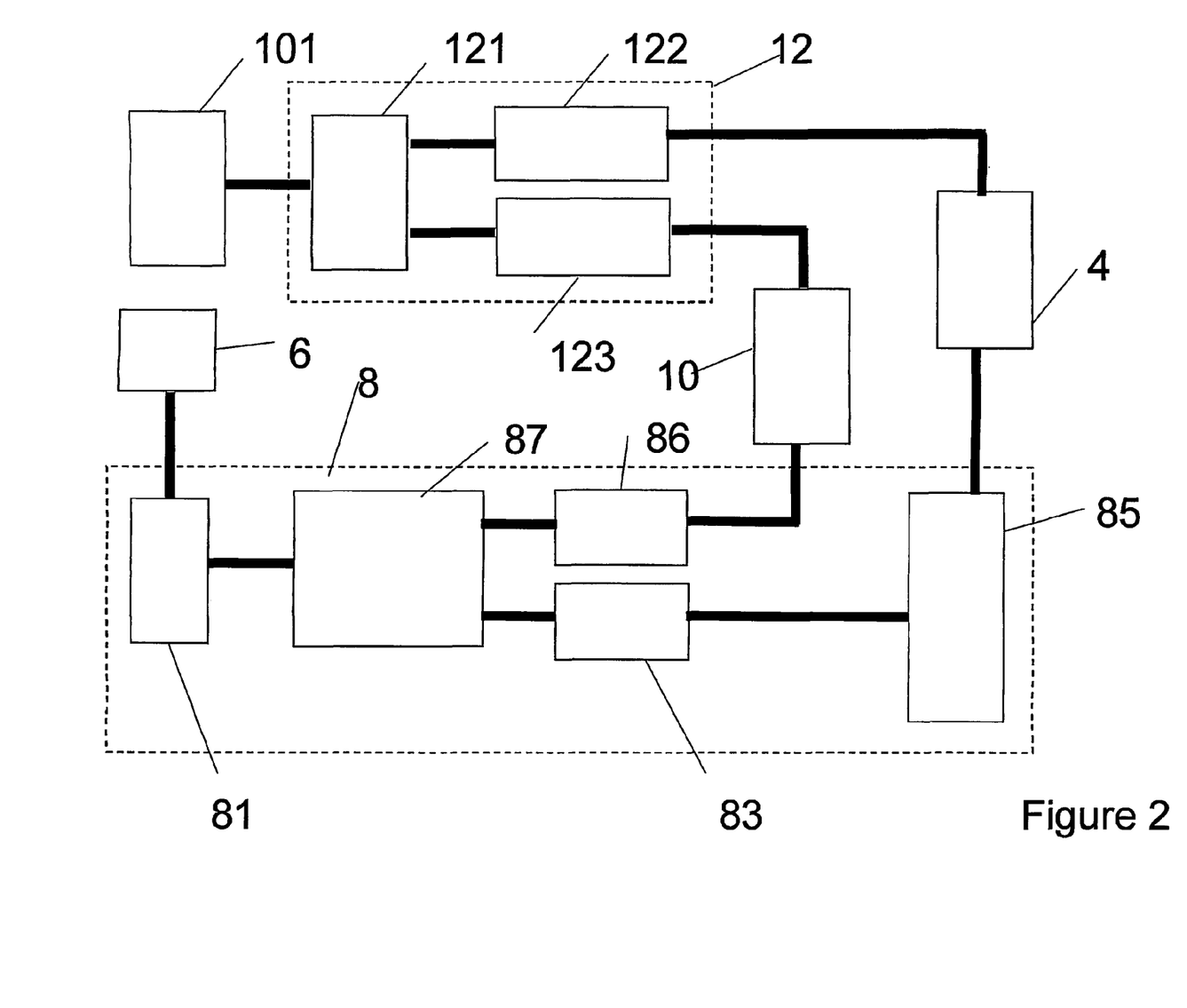
FIG. 2 shows a particular embodiment of the system for synchronizing audiovisual streams in conformity with the invention.

The invention will be better understood from a reading of an exemplary embodiment of the invention that makes reference to FIGS. 1 and 2.

In this exemplary embodiment the invention relates to a video sequence encoded in the MPEG-2 format without this constituting a reduction of the scope of the invention.

In FIG. 1, arrangement of the video interfacing 8 is adapted in such a manner as to connect at least one display device, e.g., a monitor, a video projector or a device of the television screen type 6 to at least one interface of a broadband transmission and broadcasting network 4 and to at least one telecommunication network interface 10. This arrangement is composed of module 8 comprising primarily, on the one hand, a processing unit adapted to process and in particular to decode and descramble any video stream of the MPEG-2 type according to a pre-loaded software program of decoding and descrambling in such a manner as to display it in real or deferred time, store it, register it and/or transmit it via a telecommunication network, and comprising, on the other hand, at least one screen interface 7 and one interface for connection to a local or wide-area network 5 and/or 9. Broadband transmission and broadcasting network 4 and telecommunication network can be combined in a single network.

The hard disk or the recording device of module 8 can be used as buffer memory for temporarily storing at least a part of the program or of the video sequence to be displayed in the case of a deferred display or of a limitation in a broadband of the transmission network. The display can be delayed or deferred upon the request of the user or of portal 12.

As FIG. 1 shows, connection interface 5 is connected to broadband transmission and broadcasting network 4 such as a modem, satellite modem, cable modem, a fiber optic line interface or a radio or infrared interface for wireless communication.

The content of audiovisual programs such as films will be transmitted via this classic video broadcasting connection. However, to prevent pirated copies, before transmitting the audiovisual content from server 1 or portal 12, a small part of the audiovisual content is retained in portal 12.

In the case of displaying an audiovisual program in real time, this small part of the audiovisual content retained in portal 12 is also be-transmitted to module 8 in real time via telecommunication network 10.

In the MPEG-2 format the audiovisual stream is divided into a hierarchy of structures nested into each other. Thus, a "stream" containing an indefinite number of groups of images/pictures connected to each other (GOP: Group of Pictures); a group of images/pictures containing a certain number of images/pictures (generally 12 or 15 for MPEG, but this is not obligatory); an image/picture is decomposed into slices; a slice contains a series of macroblocks; a macroblock regroups between 6 and 12 blocks; a block contains the information relative to a square of 8×8pixels in the forms of frequency coefficients. The stream is compressed by a direct cosine transformation (DCT) that is applied to each block in such a manner as to concentrate the pertinent information in only certain coefficients in such a manner as to be able to suppress the others and thus reduce the quantity of information to be stored, and at a sampling of transformed coefficients and a coding intended to reduce the size of the stream (e.g., variable-length coding or a coding of the run level type.

Nominal stream 101 comes from server 1 to be transmitted to portal 12. Analyzing device 121 of portal 12 proceeds to an analysis of nominal stream 101 to constitute on the one hand the modified main stream 122 and on the other hand the complementary information 123. Modified main stream 122 is transmitted to the client in any manner. This manner can be: Via broadband network 4 of the BLR or DSL type, via a mobile network of the GSM type, or even by means of a CD-ROM or another physical support. The client stores modified main stream 122 on a physical support 85 situated at the client's location, which physical support can be a hard disk or a CD-ROM.

When client 8 wishes to view the video sequence corresponding to this modified main stream, the client sends the request to server 12, specifying an identifier of the video sequence requested and supplying at least one identifier of the client 8. Server 12 receives the request from the client and verifies whether the client has the right to view the requested sequence using the identifier of the sequence and that of the client. This verification can be made, e.g., with the aid of a database cataloging the list of authorized video sequences for each client.

If client 8 is authorized to view the requested video sequence, server 12 establishes a connection with the client to transmit complementary information 123 via network 10. When the connection has been established, client 8 transmits to server 12 the identifiers of the position of the reading head in the requested video stream. Server 12 receives the information about the position and adapts the content of complementary information 123 transmitted to the client via connection 10 as a function of this position.

In another embodiment, the positional information is transmitted at the same time as the request for the video sequence and the server begins the broadcasting of the complementary information corresponding to this position after having verified the authorization.

Client 8 receives the part of complementary information 123 corresponding to the position of the reading head and stores it in input buffer 86. The buffer is preferably a volatile memory. At the same time, the client reads the modified main stream corresponding to this position from storage support 85 via reading buffer 83. Synthesis device 87 uses the complementary information stored in input buffer 86 and the main stream stored in reading buffer 83 to reconstitute the original stream without error and transmitting it to reader 81. The original stream read by reader 81 is then displayed on display device 6.

In this exemplary embodiment, two variables for each picture of the stream are used as position identifiers: The temporal reference variable present in the picture header field and the time code variable present in the Group of Pictures Header field for the group of pictures in which group the picture under consideration is located. These variables allow a picture in an MPEG-2 video stream with a total duration of less than 24 h to be identified in a unique manner. The client regularly transmits a position in the video stream to the server by communicating these two pieces of data to it. The server adapts the portion of the complementary information to be transmitted as a function of this position. In fact, each portion of the complementary information contains a copy of these position identifiers or synchronization elements that permit a unique connection to be made between the picture of the modified main stream and the corresponding portion of the complementary information that permits the modified main stream to be modified to reconstitute the corresponding part of the nominal stream.

In this exemplary embodiment, the complementary information is contained in a single file. When server 12 receives the positional variables coming from the client it determines the portion of complementary information to be transmitted by browsing this file. To make the searching for the desired portion more rapid, the invention can advantageously make use of a table that makes a position in this file correspond to a picture of the scrambled main stream, which table is realized during a previous phase associated with the analysis of the main stream.

In an alternative embodiment, the synchronization element or position identifier of the reading head in the stream available on the recipient equipment is the number of the current image/picture, that is to say, the order of appearance of this the image/picture within the corresponding modified main stream. For example, the first picture of the modified main stream has the number 1, the second picture the number 2 and the 22nd picture the number 22. This number is also indicated in the complementary information in such a manner as to be capable of establishing the connection between the picture of a modified main stream and the portion of the corresponding complementary information that permits the modified main stream to be transformed to reconstitute the corresponding part of the nominal stream.

In a third exemplary embodiment, the synchronization elements or position identifiers of the reading head in the stream available on the recipient equipment are binary words calculated from the modified main stream and one given binary word is specific to the content of a given portion of the modified main stream, which portion is characterized by its binary position defined by the number of bits separating it from the beginning of the stream, and its size, which binary word is specified in the portion of the corresponding complementary information. This binary word is calculated according to the binary content of this portion in such a manner that two different referenced portions produce different binary words. To obtain the binary word, a table of hash code can be used. A hash code table is a set of inputs, each of which is constituted of one key and one value. It is not possible to have two inputs with the same key. From a key, a hash code table can very rapidly find the corresponding input. There are numerous algorithms of this type that are especially used in telecommunications for detecting transmission errors.

In a variant of the previous example, this binary word is not calculated according to the binary content of a portion of the modified main stream characterized by its binary position and its size, but rather according to the binary content of a given picture of the modified main stream.

In another exemplary embodiment, the synchronization elements or position identifiers of the reading head in the stream available on the recipient equipment are binary words inserted into each user fields of the modified main stream (user data field of MPEG/2 that can be inserted before each picture of an MPEG-2 video stream) and into the portion of corresponding complementary information. Each binary word is different in such a manner that the connection between a picture of the modified main stream and a portion of the complementary information is unique.

Whatever the manner of constitution of these position identifiers of the reading head, in a normal and continuous operation of displaying the video stream (simple reading), client 8 transmits information to the server corresponding to the last image/picture or to the last displayed portion of the stream available on the recipient equipment that can be issued from the modified main stream if the client did not receive the corresponding complementary information for modifying the main stream to reconstitute the corresponding part of the nominal stream, or issued from the reconstituted stream identical to the nominal stream in the contrary case. The server receives this positional information and calculates the portion of complementary information to be transmitted to permit viewing the content in accordance with this last displayed position. In the embodiment of interest, this calculation is possible due to the correspondence between the temporal reference couples (temporal code present in the messages transmitted by the client to the server) and the couples of the same nature described in the complementary information. In normal operation, the position transmitted by client 8 corresponds to a portion of complementary information recently transmitted by server 12. The latter thus transmits the following portion of the complementary information to client 8 by network 10. This portion corresponds in fact to pictures that the client will soon display on display device 6 to allow synthesis device 87 time to descramble the stream. If the server transmits the complementary information corresponding to what the client is currently displaying, the latter arrives too late at the client's location to be able to be used and it is therefore necessary to transmit it with a slight anticipation. Server 12 transmits the complementary information by packets, each comprising the information necessary to reconstitute several pictures. If each packet corresponds to a duration t of the video sequence and transmission of the packet occupies a duration t', server 12 waits a duration t-t' between the end of the transmission of a packet and the start of the transmission of the following packet. At the end of this wait, the server wakes up and analyzes the messages coming from the client. These messages then condition the behavior of the server in the manner described above.

Server 12 transmits portions of complementary information as long as it receives messages from client 8 giving it the position of the reading head. When the client stops the reading (a pause or stop or network disconnection) it stops transmitting positional information to the server. In this realized example if the server does not receive messages from the client equipment during the time necessary for the latter to view the video stream corresponding to the last packet of complementary information transmitted (duration t), that is to say, if it is not to receive new messages when it has been waked up, it stops transmitting portions of complementary information.

Transmission of portions of complementary information reassumes when the client recommences reading the video sequence and thus recommences transmitting positional information. Thus, in the case of a network failure preventing communication between the client equipment and the server, when the failure occurs the server ceases to receive position identifiers of the reading head and therefore stops transmitting the complementary information; and when the failure ceases the client equipment transmits its current position in the stream available on the client equipment, the server receives it, adapts to it and transmits the corresponding complementary information. Likewise, in the case of a pause or a halting of the viewing of the video stream by the client, the server no longer receives messages from the client and therefore stops transmitting the complementary information. The latter reassumes when the client starts reading the video stream again that is available on the client equipment.

In the case in which the client desires to stop viewing the video stream for a prolonged duration, the client-server session is advantageously closed. When the session recommences following the desire of the client to start viewing the video stream again and following reconnection to the server, the server transmits the complementary information from the portion corresponding to that which it received before the end of the session. Display of the video stream of the client equipment does not recommence until at the moment at which it begins to receive the complementary information from the server.

If the client goes back in the video sequence, the new position transmitted to the server is a position prior to the last position transmitted. The following transmission of the server is therefore a part of the complementary information situated before the last part transmitted. The quantity and therefore the duration of the complementary information transmitted by the served is a function of the reverse speed that was selected by the client. This functionality permits several reverse return speeds to be offered on the client equipment.

Likewise, if the client transmits a command "rapid advance" in the video sequence, the new position transmitted to the server is subsequent to the position "expected" by the server, that is, the position corresponding to the last part of the complementary information transmitted by the server to the client. The following transmission of the server is therefore a part of the complementary information situated after the last part transmitted. The quantity of the complementary information transmitted by the server is a function of the "rapid advance" speed that was selected by the client. This functionality permits several "rapid advance" speeds to be offered on the client equipment.

To improve the synchronization between the server and the client, the invention also comprises a mechanism for acknowledging reception. The portion of complementary information transmitted by server 12 is stored in entrance buffer 86. If synthesis device 87 requires this complementary information for reconstituting the original stream and if this occurs, client 8 transmits a confirmation message for specifying to server 12 whether it received the complementary information and rather it was able to use it for the display. If the client was not able to use the complementary information, this signifies to the server that this information arrived too late (after the moment at which it should have been used) and therefore that the client and the server are out of sync. In this instance, input buffer 86 is empty and server 12 adapts the information stream that it is transmitting in such a manner as to refill this buffer. To this end, server 12 must anticipate the reading of client 8 longer. It then has two solutions:

Either it increases the number of pictures in the next packet.
    This solution allows the continuity of the displayed stream to be retained but necessitates a network 10 sufficiently large to support a momentary increase of the traffic;

Or, it selects a portion of complementary information subsequent to that which it should have transmitted to assure the continuity of the video stream. Then, the pictures for which no complementary information is transmitted remain scrambled.

In another exemplary embodiment, the network protocol used for the communications between the client and the server is UDP (User Datagram Protocol).

Finally, another embodiment concerns the synchronization in a protection system applied to audiovisual streams in the MPEG-2 TS (Transport Stream) format, defined by the MPEG-2 standard for broadcasting data that is robust retransmission errors on the networks. Each of the audio or video tracks contained in the stream is decomposed into a series of packets of 188 bytes called "TS packets." Each TS packet contains a header indicating to which audio or video track the packet is attached, the order of processing the packets and the synchronization information for the associated audio and video tracks.

During the scrambling stag; some of the TS packets relative to the video streams are substituted by "decoy" packets in conformity with the standard to visually degrade the video stream. Each MPEG-2 packet in the stream is identified in a unique manner in order to correctly synchronize the modified main stream and the complementary information and to reinsert the original packets into the stream during the descrambling phase.

The operation of descrambling the stream protected by the substitution of TS packets is simple and efficacious. The descrambling module utilizes information relative to the MPEG-2 encapsulation of data, called "identifiers" without utilizing the data relative to the video content for the synchronization.

These identifiers utilized for the synchronization are:
  PID (Program Identity) of the substituted packet;
  The continuity counter of the substituted packet;
  The last PCR (Program Clock Reference) encountered relative to the video stream concerned;
  The occurrence index of this continuity counter from the last MPEG-2 packet including a PCR. As this index is not present in the header of the TS packets, it is calculated during the scrambling and descrambling phases.

The "program identifier" of a TS packets is located in the header of each TS packet, allowing an MPEG-2 decoder to associate all the TS packets relative to one in the same stream during the demultiplexing.

The continuity counter of a TS packet is a cyclical counter varying between 0 and N-1 and permitting the packets to be put back in order in the case of a permutation or loss of packets due to a network transmission error in a group of N consecutive packets.

The program clock reference is an optional binary field and allows the decoder to calculate a time base.

The occurrence index of the continuity counter not present in the TS packets is calculated by analysis and scrambling module 12. This occurrence index corresponds for a given packet to the number of TS packets having the same program clock reference and the same continuity counter that followed one another since the last program clock reference field. The program clock reference is relative to the program identifier of the packet. Consequently, a TS packet containing a program clock reference will necessarily have an occurrence index of 1. The TS packet of the same program identifier and the same continuity counter that follows therefore has an occurrence index of 2 (if no program clock reference slipped in for this stream in the meantime). The occurrence indices of the following packets are incremented by 1 if their continuity counter has turned through one cycle (N) and their program identifier is identical until a new program clock reference relative to the same stream is encountered.

When the scrambling module backs up in the complementary information the original TS packets that were substituted, it systematically associates the four identifiers previously cited with them:
  The program identifier of the packet allows it to be known, on the client side, to which elementary stream the packet belongs.
  The last program clock reference encountered permits the situating of the temporal slice (with a granularity of 100 ms) to which the packet belongs.
  The occurrence index of the continuity counter permits the identification of a group of N TS packets to which the packet belongs.
  The continuity counter permits the identification of exactly which packet is being referred to within this group of N packets.

These four identifiers are used for synchronization during the descrambling phase and the occurrence index of the continuity counter is also recalculated during the descrambling phase.

For example, in a solution of broadcasting MPEG-2 TS streams protected in real time, when client 8 wishes to display the stream, the server transmits part of the complementary information containing the original TS packets in advance, including associated TS synchronization information. When descrambling module 87 receives a packet of complementary information, it realizes with the aid of synchronization identifiers the correspondence with the packets of the modified main stream and substitutes them with the original packets present in the complementary information.

Within the framework of an application of video on demand, the descrambling module regularly transmits to server 12 the synchronization identifiers from the packets of the modified main stream that is in the course of being descrambled and displayed on viewing screen 6. In this manner server 12 deduces from them the portion of complementary information which the client requires in the coming instants and sends it the necessary packets of complementary information.

The invention claimed is:

1. A process for distributing video sequences in accordance with a nominal stream in a format including a succession of images or pictures comprising:
  analyzing the nominal stream, prior to transmission to client equipment and generating a modified main stream, having a format of the nominal stream and images or pictures modified by substitution of selected data by similar data, but random or calculated, and having complementary information of any format including substituted data and digital information suitable to permit reconstruction of a modified nominal stream;
  transmitting the modified main stream in real or deferred time and the complementary information in real time at substantially a moment of display from a server to the client equipment;
  synthesizing an available stream in a nominal format on the client equipment which is reconstituted as a function of the modified main stream, the complementary information and a reading of the stream on the client equipment;

during reading of the stream, generating a position identifier as a function of characteristics of the stream and;

transmitting the position identifier to the server that activates in response sending the complementary information as a function of the position identifier, the position identifier allowing the synchronization of the modified stream with the received complementary information;

wherein the format of the nominal stream is in an MPEG-2 TS format and the position identifier includes four variables identifying the program, program clock reference, continuity counter and occurrence index of the continuity counter, which occurrence index of the continuity counter results from a calculation applied to TS packets.

2. The process according to claim 1, wherein each picture of the nominal stream is associated with a position identifier.

3. The process according to claim 1, wherein the reading stage comprises calculating the position identifier of the picture read.

4. The process according to claim 1, wherein the reading stage comprises calculating the position identifier of the stream read.

5. The process according to claim 1, wherein the complementary information is transmitted in portions.

6. The process according to claim 1, wherein the available stream on the recipient equipment of which the reading conditions the position and the portion to be sent of the complementary information is a part of the modified main stream.

7. The process according to claim 1, wherein the available stream on the recipient equipment of which the reading conditions the position and the portion to be sent of the complementary information is a part of the reconstituted nominal stream.

8. The process according to claim 1, wherein the format of the nominal stream is defined by an MPEG-2 standard.

9. The process according to claim 8, wherein the position identifier for an image or picture includes a time code variable associated with a group of images res images or pictures in which the image or picture under consideration is located and the temporal reference variable of the image or picture.

10. The process according to claim 1, wherein each portion of the complementary information sent by the server permits reconstitution of at least one image or picture of the original stream during the synthesis.

11. The process according to claim 1, wherein the server adapts the size and content of each portion of the complementary information to be sent as a function of the position identifier.

12. The process according to claim 1, wherein each portion of the complementary information is sent in advance relative to an instant of display of this picture of the steam reconstituted with the portion.

13. The process according to claim 1, wherein the sender adapts sending complementary information when the user of the recipient equipment pauses, thereby stopping the transmission of complementary information.

14. The process according to claim 1, wherein the server adapts sending complementary information when the user of the recipient equipment makes a rapid advance or a rapid return by sending a portion corresponding to a proper position for the commands "rapid advance" and "rapid return."

15. The process according to claim 1, wherein the server adapts transmission of complementary information when a network breakdown occurs that prevents client-server communication by stopping transmission of complementary information during the breakdown and restarting it when the breakdown stops and it again receives messages coming from the client.

16. The process according to claim 1, wherein prior to transmitting the complementary information, the server creates a table associating the pointers to the portion of the complementary information with temporal positions relative to images or pictures of the video stream, stores the table on a support connected to the server and consults the table to determine a portion of complementary information to be transmitted after having received the position identifier.

17. Equipment for producing a video stream comprising:
at least one multimedia server containing original video sequences in accordance with a nominal stream in a format including a succession of images or pictures;
a device for analyzing the nominal stream coming from the server, prior to transmission to client equipment and generating a modified main stream having a format of the nominal stream and images or pictures modified by substitution of selected data by similar data, but random or calculated, and having complementary information of any format including substituted data and digital information suitable to permit reconstruction of a modified nominal stream;
a device for transmitting the modified main stream in real or deferred time and the complementary information in real time at substantially a moment of display from a server to the client equipment;
a device for synthesizing an available stream in a nominal format on the client equipment which is reconstituted as a function of the modified main stream, the complementary information and a reading of the stream on the client equipment;
a device for generating, during the reading of the stream a position identifier as a function of characteristics of the stream and;
a device for transmitting the position identifier to the server that activates in response sending the complementary information as a function of the position identifier, the position identifier allowing the synchronization of the modified stream with the received complementary information;
wherein the format of the nominal stream is in an MPEG-2 TS format and the position identifier includes four variables identifying the program, program clock reference, continuity counter and occurrence index of the continuity counter, which occurrence index of the continuity counter results from a calculation applied to TS packets.

18. A system for transmitting a video stream according to the process of claim 1, comprising equipment for producing a video stream, at least one piece of equipment for using a video stream and at least one communication network between the production equipment and the piece or pieces of equipment.

* * * * *